United States Patent [19]
Young et al.

[11] Patent Number: 5,679,479
[45] Date of Patent: Oct. 21, 1997

[54] BATTERY SEPARATOR

[75] Inventors: James Young, Sunriver; Francis E. Alexander, Corvallis, both of Oreg.

[73] Assignee: Amtek Research International LLC, Eugene, Oreg.

[21] Appl. No.: 646,764

[22] Filed: May 8, 1996

[51] Int. Cl.⁶ .................................................. H01M 2/16
[52] U.S. Cl. ...................... 429/147; 429/247; 429/249; 264/284; 264/286
[58] Field of Search ................................. 429/247, 249, 429/146, 147; 29/730, 731; 264/284, 286

[56] References Cited

U.S. PATENT DOCUMENTS

| | | | |
|---|---|---|---|
| 4,000,352 | 12/1976 | Hollenbeck et al. | 429/147 |
| 4,153,759 | 5/1979 | Marata et al. | 429/147 |
| 4,228,225 | 10/1980 | O'Rell et al. | 429/147 |
| 4,368,243 | 1/1983 | O'Rell et al. | 429/147 |
| 4,369,236 | 1/1983 | O'Rell et al. | 429/147 |
| 4,387,144 | 6/1983 | McCallum et al. | 429/251 |
| 4,403,024 | 9/1983 | Gordon et al. | 429/146 |
| 4,407,063 | 10/1983 | Johnson | 29/623.2 |
| 4,482,617 | 11/1984 | LeBayon et al. | 429/143 |
| 4,499,040 | 2/1985 | Maemoto et al. | 264/167 |
| 4,619,875 | 10/1986 | Stahura et al. | 429/143 |
| 5,266,257 | 11/1993 | Kildune | 264/224 |

*Primary Examiner*—Prince Willis, Jr.
*Assistant Examiner*—Jonathan S. Krueger
*Attorney, Agent, or Firm*—Robert E. Howard

[57] ABSTRACT

A battery separator for use in flooded cell type lead acid batteries comprising a backweb of a porous, acid resistant, embossable material with a plurality of ribs extending from at least one planar surface of the backweb. The ribs are located across the width of the backweb and extend in a direction substantially parallel to the longitudinal dimension of the backweb. Each rib is an embossed corrugated structure comprised of alternating ridges and furrows. The ridges and furrows are in non-parallel alignment to the longitudinal dimension of the separator, and preferably perpendicular thereto. The ribs are formed on a substantially flat battery separator backweb by passing the backweb through the nip formed by a pair of opposed embossing rollers.

17 Claims, 4 Drawing Sheets

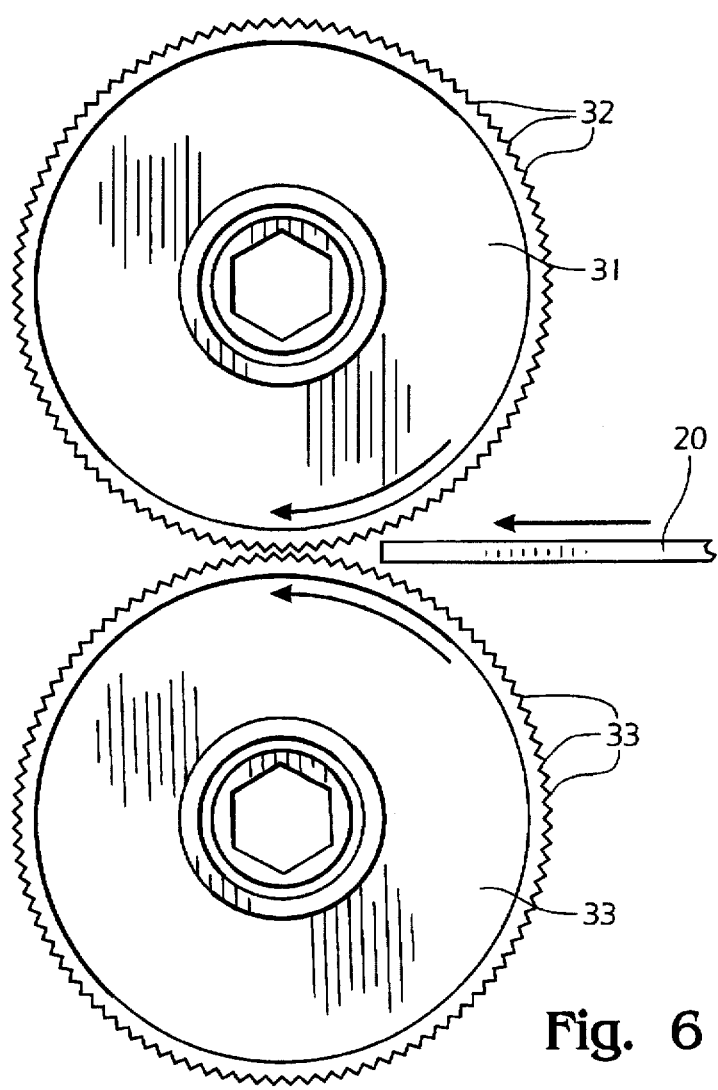
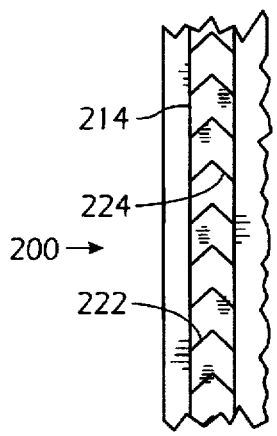
Fig. 9
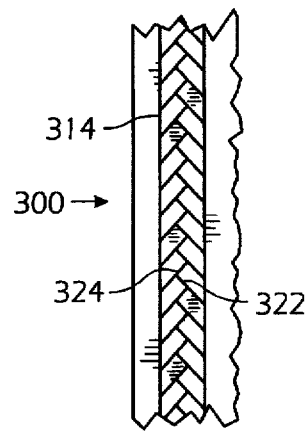
Fig. 10
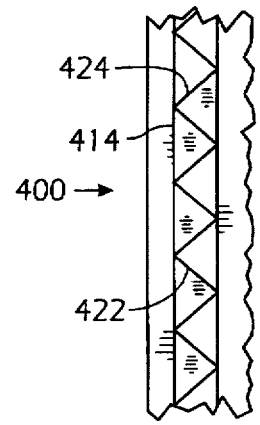
Fig. 11

BATTERY SEPARATOR

BACKGROUND OF THE INVENTION

This invention relates to a battery separator for use in flooded cell type lead acid batteries and to a method and apparatus for making the separator.

In a flooded cell type lead acid battery the positive and negative electrodes or "plates" are separated by a battery separator. The battery separator typically has "ribs" or protrusions extending from at least one planar face of the separator. Such ribs are formed in one of several ways: the ribs can be formed integrally with the backweb of the separator; the ribs can be subsequently applied to the backweb as a bead of the same or different material as the backweb; or the ribs can be formed by embossing the backweb. The ribs function to provide proper spacing between the plates and to provide a space wherein free electrolyte resides.

The battery separator currently used by most flooded cell type lead acid battery manufacturers is of the microporous polyethylene type. This type of separator has a composition consisting essentially of an ultra high molecular weight polyethylene, a filler (typically amorphous silica), a plasticizer (typically a processing oil), and certain minor ingredients such as an antioxidant, lubricant and carbon black.

Microporous polyethylene separator material is commercially manufactured by passing the ingredients through a heated extruder, passing the extrudate generated by the extruder through a die and into the nip formed by two heated calender rolls to form a continuous web, extracting a substantial amount of the processing oil from the web by use of a solvent, drying the extracted web, slitting the web into lanes of predetermined width, and winding the lanes into rolls.

Such separators and a method of manufacturing them are described in U.S. Pat. No. 3,351,495.

Microporous polyethylene separators typically have a configuration comprising a backweb having a predetermined thickness, and a plurality of parallel ribs spaced apart a predetermined distance and extending outwardly from one planar surface of the backweb. The ribs extend continuously in a longitudinal direction parallel to the edges of the separator material. A partial perspective view of such a prior art separator is illustrated in FIG. 7. The thickness of the backweb and height and spacing of the ribs is specified to the separator manufacturer by the battery manufacturer; the specifications are designed to maximize certain battery characteristics desired by the battery manufacturer.

Such ribs are formed during manufacture of the microporous polyethylene separator by providing that one of the two heated calender rolls forming the nip through which the extrudate from the extruder is fed is engraved with grooves so that the ribs are formed as an integral part of the separator web.

There are many different specifications required by battery manufacturers relative to rib size and rib spacing. In manufacturing separator material to meet customer requirements, almost every change in rib size and spacing requires that the separator manufacturer shut down its manufacturing line in order to remove the engraved roll that had been in use to fill the prior order and to insert a differently configured engraved roll capable of producing the rib size and spacing required for the new order to be filled. Manufacturing time is lost during such shut-down and extra scrap material is generated during start-up of the line.

In addition, integrally formed ribs in the polyethylene type separator undergoes extraction along with the backweb and, because it has relatively more volume than a portion of the backweb occupying the same planar surface area, generally the ribs retain more processing oil than the backweb, thereby raising the overall electrical resistance of the separator.

It is an object of this invention to provide a separator having a new type of rib formed thereon that occupies less volume of the separator but provides at least as good spacing ability between plates as prior art ribs.

It is a further object of this invention to provide a battery separator having a rib configuration that is capable of being formed on the separator subsequent to formation of the backweb.

It is a further object of this invention to provide a simple method and apparatus for forming the ribs on such separators.

SUMMARY OF THE INVENTION

This invention relates to a battery separator having a longitudinal dimension, a width dimension perpendicular to said longitudinal dimension, upper and lower planar faces, and a plurality of ribs (at least three) projecting from at least one planar face, said ribs extending in a direction substantially parallel to the longitudinal dimension of the separator, each of the ribs being formed of a plurality of individual projecting embossments forming a corrugated structure comprised of alternating ridges and furrows.

It is preferred to have ribs extending from both planar faces of the separator. In this preferred mode adjacent projecting embossments (ridges) on one planar face are separated by an indentation (furrow) which forms a projecting embossment (ridge) on the other planar face of the separator. Where ribs extend from both planar faces of the separator, the ribs projecting from one planar surface may have a height equal to or different from the height of the ribs extending from the other planar surface.

This invention also relates to a method and apparatus for forming ribs in a substantially flat separator web having a longitudinal dimension, a width dimension perpendicular to the longitudinal dimension and upper and lower planar faces by passing a substantially continuous web of such material between a plurality of sets of aligned embossing wheels, each of the sets of aligned embossing wheels forming a single rib, adjacent sets of wheels being spaced apart by the distance desired between the ribs, each of the sets of aligned embossing wheels forming a plurality of embossments in the web of separator material in the longitudinal direction of the web.

BRIEF DESCRIPTION OF THE DRAWINGS

FIG. 6 is a side view of two adjacent embossing wheels.

FIGS. 8 through 11 are partial top plan views of the upper planar surface of the separator illustrating several alternative configurations for the rib configuration.

DESCRIPTION OF PREFERRED EMBODIMENTS

Figure 1:
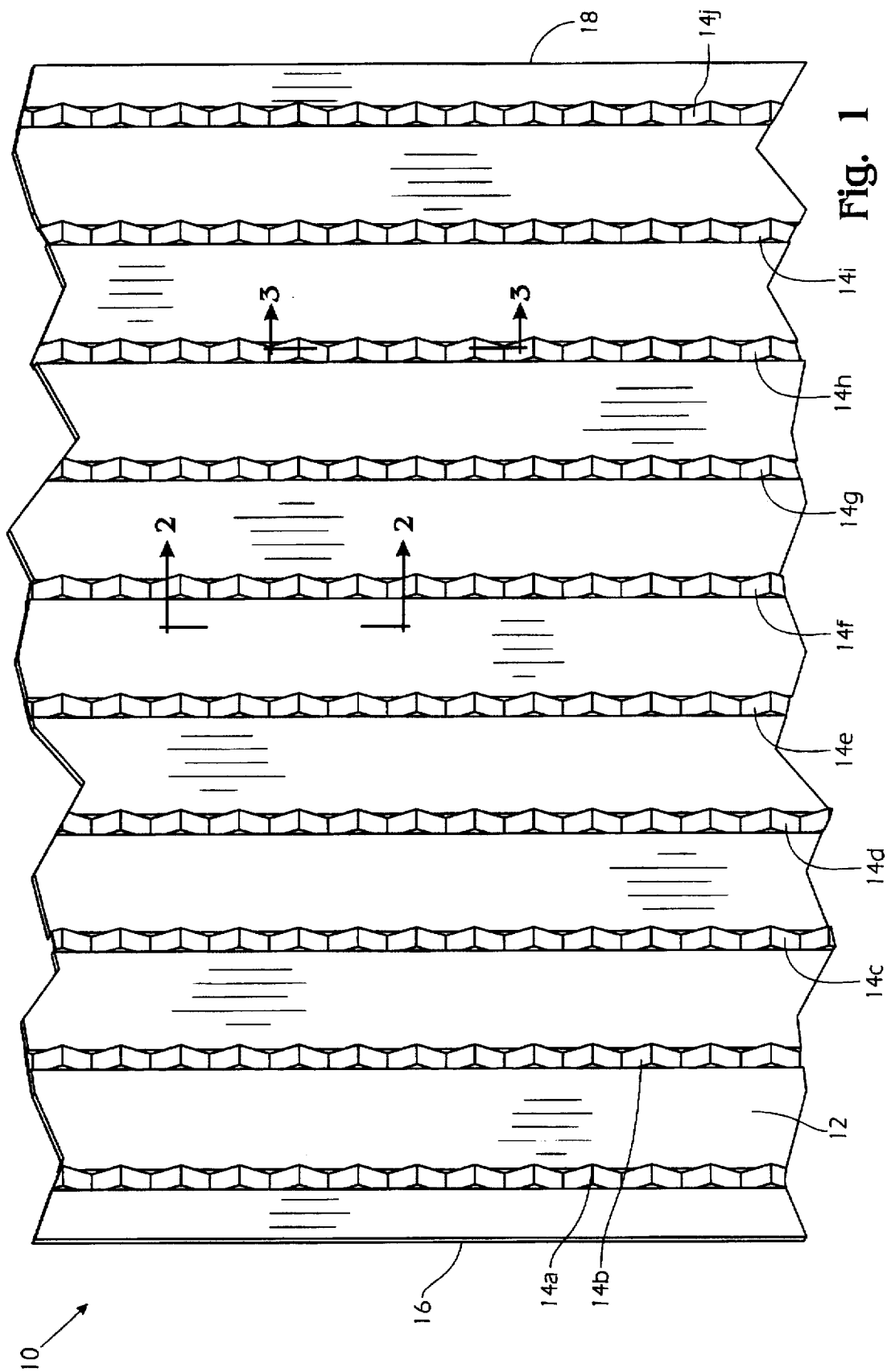
FIG. 1 is a partial perspective view of the upper planar surface of the separator material of this invention.

FIG. 1 is a partial perspective top view of the separator of this invention. Projecting from the upper planar surface 12 of separator 10 are a plurality of ribs 14a through 14j. The ribs 14 are disposed in narrow lanes in the longitudinal direction of the separator 10, substantially parallel to longitudinal edges 16 and 18 thereof.

Figure 2:
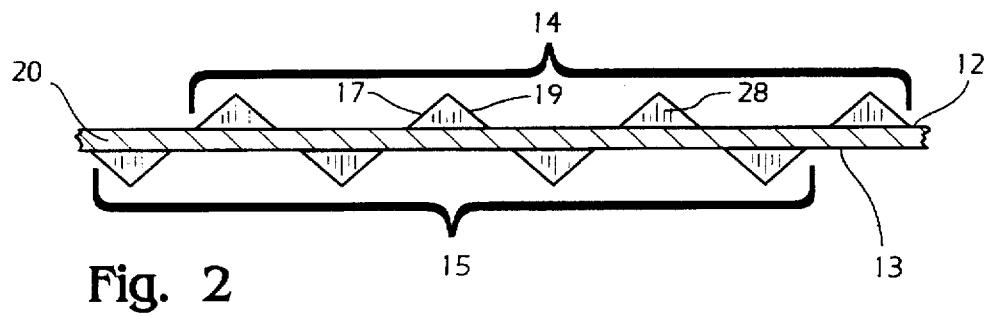
FIG. 2 is an enlarged partial edge view in cross-section of the separator taken along line 2—2 of FIG. 1.

FIG. 2 is a partial edge view in cross-section of separator 10 taken along Line 2—2 of FIG. 1. Rib 14 projects above upper planar surface 12 of backweb 20 of separator 10. Projecting below lower planar surface 13 of backweb 20 is a rib 15. Ribs 14 and 15 are identical in width and lie in the same vertical plane.

Figure 3:
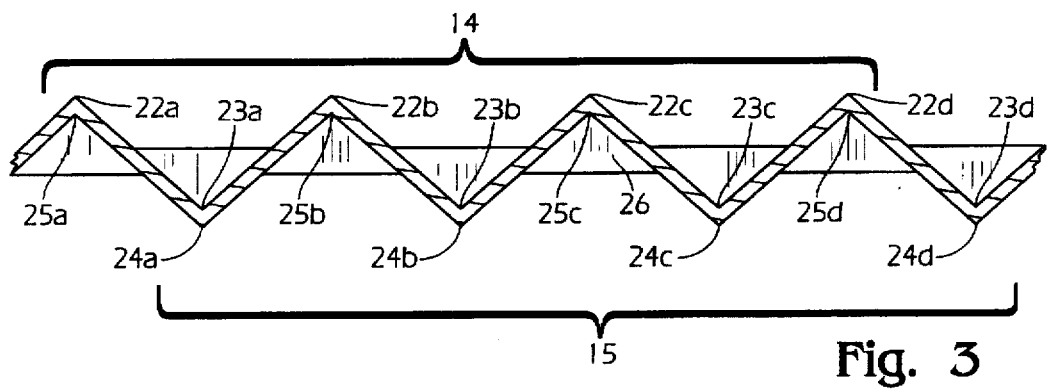
FIG. 3 is an enlarged partial edge view in cross-section of a separator rib taken along line 3—3 of FIG. 1.

A partial edge view in cross-section of ribs 14 and 15 is illustrated in FIG. 3. As can be seen, rib 14 is a corrugated structure comprised of alternating ridges and furrows 22a and 23a, 22b and 23b, 22c and 23c, 22d and 23d, etc., respectively. Likewise, rib 15 is a corrugated structure comprised of alternating ridges and furrows 24a and 25a, 24b and 25b, 24c and 25c, 24d and 25d, etc., respectively. A ridge on one planar surface forms the furrow on the other planar surface, and vice versa. For example, the underside of ridge 22a of rib 14 forms the furrow 25a of rib 15.

Figure 4:
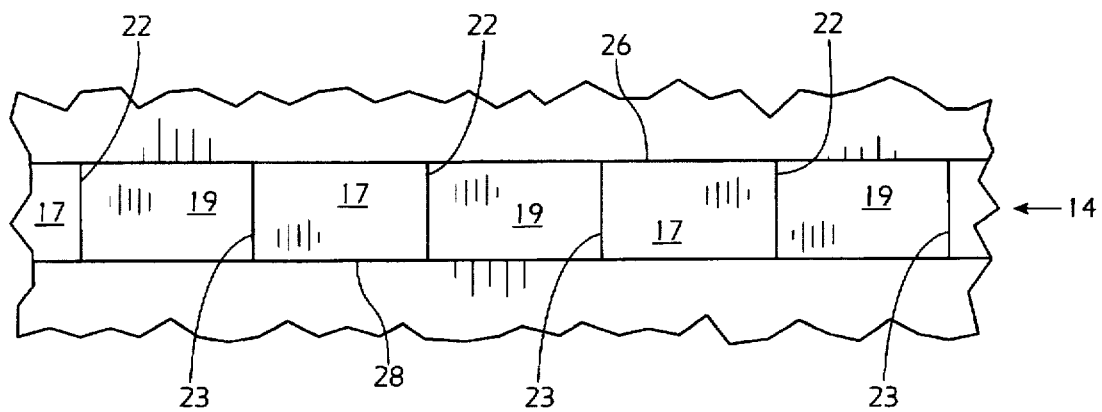
FIG. 4 is an enlarged partial top plan view of a single rib of this invention.

FIG. 4 is an enlarged, partial top view of a rib 14. As can be seen, ridges 22 and furrows 23 of rib 14 are perpendicular to the longitudinal side walls 26 and 28 of rib 14 and thus also perpendicular to the longitudinally disposed side edges 16 and 18 of separator 10.

The length dimension of the ridges 22 and 24, i.e., the length of the ridges 22 and 24 from one side wall 26 to the other side wall 28 of rib 14, is selected in accordance with the desired width of the narrow lanes constituting the ribs. This dimension will generally be between about 0.020 and about 0.060 inch.

The frequency of the ridges, i.e., the number of ridges per unit of rib length, will preferably be between about 5 and about 25 ridges per inch.

The height of the ridges 22 and 24 above the respective planar surfaces 12 and 13 of the backweb 20 is selected in accordance with the desired height of the ribs. This dimension will generally be between about 0.01 to about 0.10 inch.

The distance between adjacent ribs will generally be between about 0.25 to about 1.0 inch.

The width of the separator of this invention can be any width used by battery manufacturers; generally this width will range between about 2 to about 12 inches.

The thickness of backweb 20 of the separator 10 will typically range between about 0.002 to about 0.025 inch.

The cross-section of the corrugated structure forming the rib of this invention is illustrated in FIGS. 1–4 as being triangular, with each individual embossed projection thus being wedge shaped. Each wedge shaped embossment is comprised of a sloping leading wall 17, a sloping trailing wall 19 and vertical side walls 26 and 28. However, other similar wedge shapes may be use, including but not limited to a rounded wedge shape where the ridge is slightly rounded instead of angular, or a flattened wedge shape where the ridge is either formed flat during embossing or the ridge flattened by subsequent pressing.

One of the advantages obtained in using the separator of the present invention is that, since the ribs are a corrugated structure formed of adjacent ridges and furrows, the separator provides a substantially barrier free environment for flow of electrolyte and any gases released during charging and discharging since the ribs contact the plates only in the ridge area. Prior art ribs (see, for example, FIG. 7), being sold, are in contact with the positive plate in the entire upper surface area of the rib which imposes a barrier to electrolyte and/or gas flow.

A further advantage obtained in using the separator of the present invention is in reducing or eliminating rib bending and/or flattening. In assembling a battery the number of alternating enveloped (with separator material) and unenveloped plates required to form a cell are stacked together, compressed and inserted into a cell compartment of a battery case. The compressive forces to which the separators are subjected can cause undesirable rib bending and/or flattening with conventional rib construction, especially at higher "overall" dimensions, i.e., rib heights. The rib configuration of the present invention reduces or eliminates such rib bending and/or flattening. Although the separator of the invention is illustrated as having ribs 14 and 15 extending from both planar surfaces 12 and 13 of the backweb 20, the invention is intended to include a separator where the ribs are formed on only one side. Similarly, although the ribs 14 and 15 are illustrated as having the same height above planar surfaces 12 and 13, respectively, of backweb 20, the height of the ribs on one side may be greater or lesser than the height of the ribs on the other side.

Figure 5:
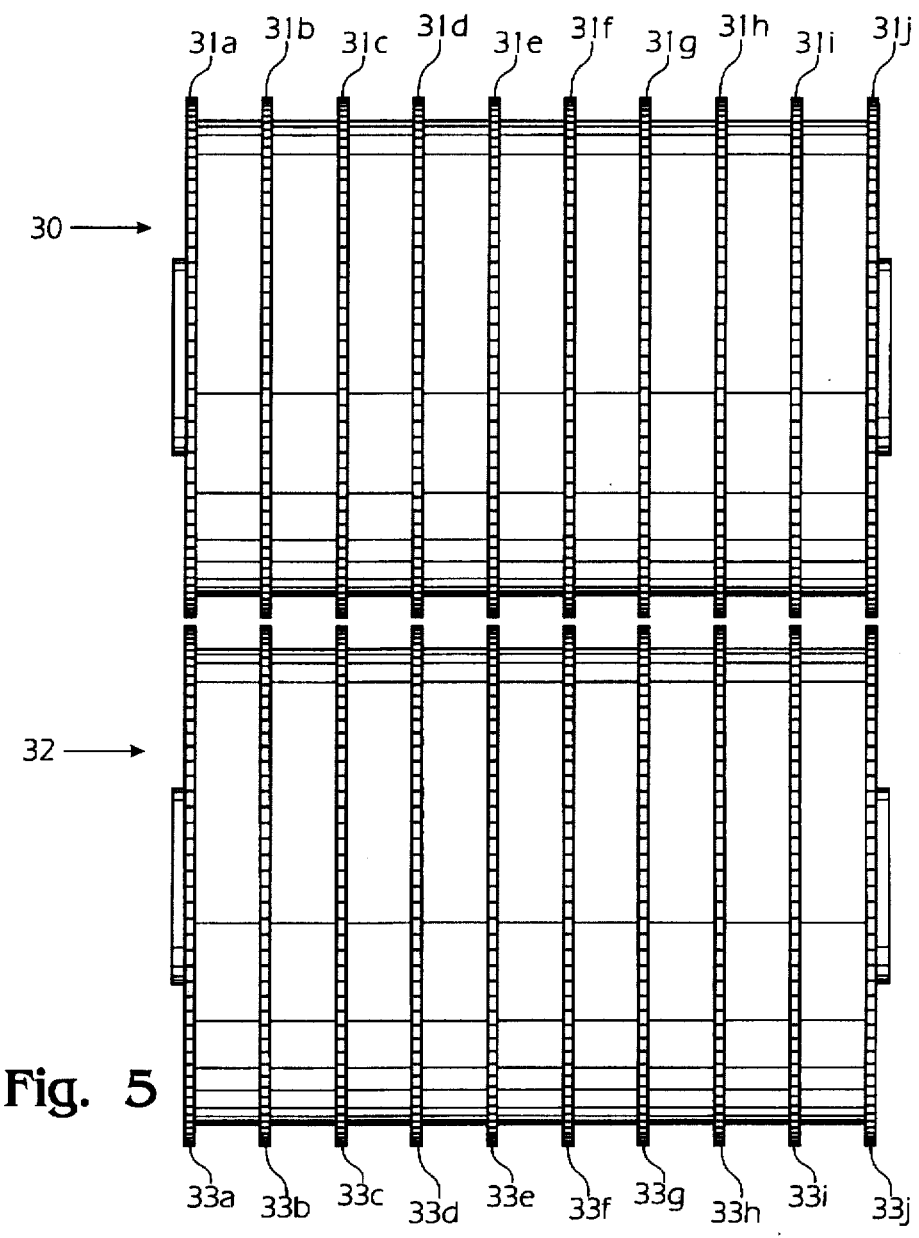
FIG. 5 is a frontal view of two embossing rolls employing a plurality of embossing wheels.

In addition, adjacent ridges of a rib may vary in height. FIGS. 5 and 6 illustrate an apparatus suitable for making the separators of this invention. FIG. 5 is a front view of two embossing rolls 30 and 32 having a plurality of embossing wheels 31a–31g and 33a–33g, respectively, located thereon. Each of embossing wheels 31a–31g on embossing roll 30 are aligned with embossing wheels 33a–33g, respectively, on embossing roll 32. Each of the embossing wheels 31 and 33 are, essentially, gear wheels with a plurality of gear teeth 32 and 33, respectively, projecting therefrom, as best seen in FIG. 6. The phrase "embossing wheels" is intended to include both separate gear wheels located on an embossing roll or axle (such as by press fitting) or an embossing roll having multiple rows of teeth machined therein.

Embossing rolls 30 and/or 32 are rotated by suitable drive means, not shown. It is preferred to have only one of embossing rolls 30 or 32 driven by external drive means with the other roll being rotated by the driven embossing roll. The gear teeth 32 and 34 of aligned embossing wheels 31 and 33 intermesh and emboss ribs 14 and 15 into flat separator material 20 when it is passed through the nip between rotating embossing rolls 30 and 32 in the direction indicated by the arrow in FIG. 6.

Where the height of the ribs extending from both planar faces are the same, the teeth 32 and 34 are equal in height.

Where the height of the ribs one side is different than the height of the ribs on the other side, the height of gear teeth 32 and 34 are, correspondingly, different in height.

Where it is desired to have ribs extending from only one surface of the separator, one of embossing wheels 31 or 33 may be a "male" roll having gear teeth as illustrated with the other embossing wheel being a "female" roll having grooves therein with dimensions corresponding to the dimensions of the gear teeth extending from the male roll.

Where it is desired to have a rib where adjacent ridges have different heights above the adjacent planar surface of the separator backweb this may be achieved by using as the first embossing roll a male with gear teeth of varying height and as the second embossing roll a smooth roll formed of rubber or other deformable material.

The formation of the ribs of the present invention involves plastic deformation of the backweb material in the plurality of narrow lanes where the embossing takes place. Permanent deformation indicates that the material was loaded beyond its yield point which, by definition, means that it has experienced plastic flow. It has been shown that oxidation resistance is improved in the area of plastic deformation due to oil being driven to the surface upon collapse of micropores.

Figure 7:
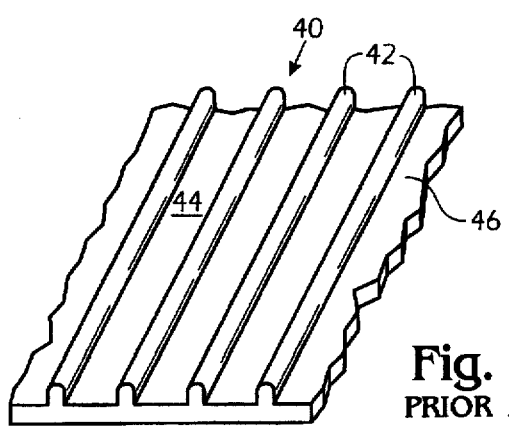
FIG. 7 is a perspective view of a portion of a prior art separator showing the backweb and integrally formed ribs extending from the backweb.

FIG. 7 is a perspective view of a prior art separator 40 having a plurality of ribs 42 extending from the upper planar face 44 of backweb 46. Ribs 42 are integral with backweb 46 and are formed during the calendering of extrudate, as described above in the discussion of the background material. In the preferred mode of practicing the present invention the web upon which ribs are formed is flat on both sides and constitutes the backweb 20 of the finished separator 10. However, it is intended to include within the definition of "flat" or "substantially flat" (as used herein) a web having some minor ribs formed therein during the calendering phase of its manufacture.

Although the invention has been described relative to forming ribs in a microporous polyethylene separator, as this is the principal type of separator material currently used by flooded cell type lead acid battery manufacturers, any separator material which is porous, acid resistant and capable of being permanently embossed may be used. These materials may be generally characterized as filled or unfilled films and nonwoven webs of thermoplastic or thermoset polymers. Suitable thermoplastic polymers include polymers and copolymers of ethylene, propylene, butylene, vinyl chloride and styrene. Suitable thermoset compositions include phenolics, ethylene/propylene/diene, isoprene, butadiene, styrene and similar thermosetting polymers.

The ribs have been illustrated in the preferred embodiment disclosed herein as having ridges and furrows that are perpendicularly aligned with the longitudinal dimension of the separator. However, the alignment of the ridges and furrows may be such as to form an angle to the longitudinal dimension of the separator, such angle being less than 180 degrees, and preferably less than about 160 degrees, to the longitudinal dimension, but greater than 0 degrees and preferably greater than about 20 degrees. In addition, the alignment of the ridges and furrows of some ribs to the longitudinal dimension of the separator may vary from the alignment of the ridges and furrows of other ribs.

Examples of such alternative configurations are illustrated in FIGS. 8–11.

Figure 8:
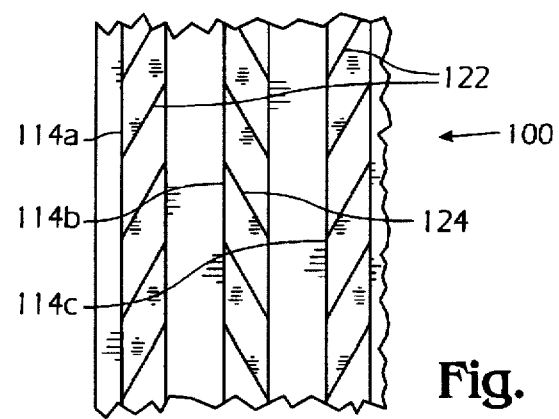

FIG. 8 illustrates a separator 100 in which the ribs 114 have embossments in adjacent ribs 114a, 114b and 114c whose ridges 122 and 124, and corresponding furrows, are alternatingly angled with respect to each other.

FIG. 9 illustrates a separator 200 in which the ridges of rib 214 form a chevron pattern made up of ridge elements 222 and 224.

FIG. 10 illustrates a separator 300 in which the ridges of rib 314 form a tractor tread pattern made up of ridge elements 322 and 324.

FIG. 11 illustrates a separator 400 in which the ridges of rib 414 form a continuous sinusoidal (zig-zag) pattern made up of ridge elements 422 and 424. The continuous sinusoidal pattern of the ridges could be rounded ("S" shaped) instead of sharp as illustrated in FIG. 11.

A primary advantage of the present invention is that it allows battery separator manufacturers to continuously produce a substantially flat sheet of microporous material without interrupting the manufacturing process to change engraved calender rolls. Such flat sheet would then be supplied to the battery manufacturer in rolls of appropriate width and the battery manufacturer would apply the ribs in accordance with this invention. It is contemplated that such ribs would be applied just prior to the plate enveloping operation.

We claim:

1. A battery separator comprising a backweb of porous, acid resistant, embossable material, said backweb having a longitudinal dimension, a width dimension perpendicular to said longitudinal dimension and an upper and lower planar surface, said backweb having a plurality of embossed ribs projecting from at least one planar surface thereof, each of said ribs being a corrugated structure comprised of alternating ridges and furrows, each corrugation of said corrugated structure being formed from and integral with said embossable backweb material, each corrugation having a sloping leading wall, a sloping trailing wall, a ridge formed where said leading and trailing walls meet, sidewalls at the outer ends of said ridge joined to said leading and trailing walls with the sapace enclosed by said leading wall, trailing wall and sidewalls being hollow, said ridges and furrows being in non-parallel alignment with said longitudinal dimension of said backweb.

2. The battery separator of claim 1 wherein said embossable backweb material is microporous polyethylene.

3. The battery separator of claim 1 wherein said ridges and furrows are substantially perpendicular to the longitudinal dimension of said backweb.

4. The battery separator of claim 1 wherein said ribs extend parallel to the longitudinal dimension of said backweb.

5. The battery separator of claim 3 wherein the frequency of said ridges is between about 5 and about 25 per inch.

6. The battery separator of claim 1 wherein said ridges and furrows are at an angle to the longitudinal dimension of said backweb of between about 20 degrees and about 160 degrees.

7. The battery separator of claim 6 wherein the ridges and furrows of at least some of the ribs are at a different angle to the longitudinal dimension of said backweb than that of the ridges and furrows of immediately adjacent ribs.

8. The battery separator of claim 7 wherein the ridges and furrows of a first set of ribs consisting of every other rib is at an angle to the longitudinal dimension of said backweb of between about 20 degrees and less than about 90 degrees and the angle of the ridges and furrows of a second set of ribs consisting of ribs immediately adjacent said first set of ribs is at an angle to the longitudinal dimension of said backweb of between about 160 degrees and greater than about 90 degrees.

9. The battery separator of claim 1 wherein said ridges and furrows of at least some of the ribs are in a chevron pattern.

10. The battery separator of claim 1 wherein said ridges and furrows of at least some of the ribs are in a tractor tread pattern.

11. The battery separator of claim 1 wherein said ridges and furrows of at least some of the ribs are in a continuous sinusoidal pattern.

12. A method of forming ribs on a battery separator comprising unwinding a substantially flat web of a porous, acid resistant, embossable separator material from a roll, said web having an upper and a lower planar surface, feeding the web along a path and embossing said web in a plurality of narrow lanes by subjecting at least one planar face of said web material to plastic deformation at a plurality of embossment sites within said lanes to form in each of said lanes a corrugated structure extending from the other planar face of web, said corrugated structure having alternating ridges and furrows that are non-parallel to said longitudinal edges of said web.

13. The method of claim 12 wherein said embossing is effected by passing the web into the nip formed by pairs of opposed embossing wheels positioned in the locations of said narrow lanes.

14. The method of claim 12 wherein said separator material is microporous polyethylene.

15. An apparatus for forming ribs on a battery separator web comprising a pair of opposed rotatably mounted embossing rolls having parallel longitudinal axes, at least one of said rolls having a plurality of embossing wheels having a common axis with said roll located at spaced apart embossing locations along the length of said roll, the distance betweeen said embossing locations corresponding to the distance between ribs to be formed on the battery separator web, and drive means for rotating at least one of said embossing rolls.

16. The apparatus of claim 15 wherein both embossing rolls have opposed embossing wheels.

17. The apparatus of claim 15 wherein said opposed embossing wheels comprise gears having a plurality of intermeshing gear teeth.

* * * * *